US012597298B2

(12) United States Patent
Inoue et al.

(10) Patent No.: US 12,597,298 B2
(45) Date of Patent: Apr. 7, 2026

(54) WATERCRAFT POSITIONAL INFORMATION MANAGING SYSTEM, SERVER, AND WATERCRAFT POSITIONAL INFORMATION MANAGING METHOD

(71) Applicant: YAMAHA HATSUDOKI KABUSHIKI KAISHA, Iwata (JP)

(72) Inventors: Hiroshi Inoue, Shizuoka (JP); Tomoaki Sato, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 197 days.

(21) Appl. No.: 18/122,151

(22) Filed: Mar. 16, 2023

(65) Prior Publication Data

US 2023/0306797 A1      Sep. 28, 2023

(30) Foreign Application Priority Data

Mar. 23, 2022     (JP) ................................. 2022-047152

(51) Int. Cl.
*G07C 5/02*        (2006.01)
*G05D 1/00*        (2024.01)
*G07C 5/00*        (2006.01)
(52) U.S. Cl.
CPC ............. *G07C 5/02* (2013.01); *G05D 1/0206* (2013.01); *G07C 5/008* (2013.01)
(58) Field of Classification Search
None
See application file for complete search history.

(56) References Cited

U.S. PATENT DOCUMENTS

2008/0228515 A1*  9/2008  Tachikawa ............. G06Q 10/08
                                                      705/1.1
2013/0110329 A1*  5/2013  Kinoshita ............ G05D 1/0206
                                                      367/107

(Continued)

FOREIGN PATENT DOCUMENTS

JP        2008-225614 A      9/2008
JP        2016-189083 A      11/2016

OTHER PUBLICATIONS

Official Communication issued in corresponding European Patent Application No. 23161192.2, mailed on Aug. 22, 2023.

*Primary Examiner* — James J Lee
*Assistant Examiner* — Elizabeth Galyn Martinez
(74) *Attorney, Agent, or Firm* — Keating & Bennett, LLP

(57)        ABSTRACT
A watercraft positional information managing system in which GPS-based positional information is prevented from being falsified includes a server and a watercraft. The watercraft includes a propulsion device and a communicator to communicate with the server. The communicator includes a position detector to detect positional information of the watercraft. The propulsion device includes an engine and a controller configured or programmed to control the engine. The controller is connected to the communicator and outputs data related to the engine to the communicator. The communicator transmits the data related to the engine and the positional information of the watercraft to the server. The server receives the data related to the engine and the positional information of the watercraft and determines whether or not the positional information of the watercraft is genuine based on the data related to the engine.

10 Claims, 7 Drawing Sheets

(56)     References Cited

U.S. PATENT DOCUMENTS

2018/0292215 A1* 10/2018 Akuzawa ............. G05D 1/0011
2019/0311553 A1* 10/2019 Kawase .................. B63B 79/10
2020/0204464 A1*  6/2020 Watson .................. B64D 43/00
2021/0318139 A1    10/2021 Loch et al.
2022/0129903 A1*  4/2022 Sambhar ............. G06Q 20/308

* cited by examiner 63
61
64
62
67
66a
66b
66c
65
32
68

WATERCRAFT POSITIONAL INFORMATION MANAGING SYSTEM, SERVER, AND WATERCRAFT POSITIONAL INFORMATION MANAGING METHOD

CROSS REFERENCE TO RELATED APPLICATIONS

This application claims the benefit of priority to Japanese Patent Application No. 2022-047152 filed on Mar. 23, 2022. The entire contents of this application are hereby incorporated herein by reference.

BACKGROUND OF THE INVENTION

1. Field of the Invention

The present invention relates to a watercraft positional information managing system, a server, and a watercraft positional information managing method.

2. Description of the Related Art

In the fishery market, branding of fish is intended, for instance, by clarifying the location of fish caught such that the selling price of the fish can be made higher. It can be assumed that a watercraft is equipped with a GPS (Global Positioning System) receiver so as to clarify the position of fish caught, however, chances are that GPS-based positional information is falsified.

As a technology for determining whether or not GPS-based positional information is genuine, there has been disclosed a technology for transmitting GPS-based positional information obtained by a client side to a server, then checking if the GPS-based positional information is matched with satellite positional and orbital information obtained by the server, and determining whether or not the GPS-based positional information is genuine (see Japan Laid-open Patent Application Publication No. 2008-225614).

However, when the GPS receiver is installed in another watercraft to falsify the GPS-based positional information, this makes it impossible to determine whether or not the GPS-based positional information is genuine. Thus, the GPS-based positional information cannot be prevented from being falsified.

SUMMARY OF THE INVENTION

Preferred embodiments of the present invention provide watercraft positional information managing systems, servers, and watercraft positional information managing methods in which GPS-based positional information is prevented from being falsified.

A watercraft positional information managing system according to a preferred embodiment of the present invention includes a server and a watercraft. The watercraft includes a propulsion device and a communicator to communicate with the server. The communicator includes a position detector to detect positional information of the watercraft. The propulsion device includes an engine and a controller configured or programmed to control the engine. The controller is connected to the communicator. The controller outputs data related to the engine to the communicator. The communicator transmits the data related to the engine and the positional information of the watercraft to the server. The server receives the data related to the engine and the positional information of the watercraft and determines whether or not the positional information of the watercraft is genuine based on the data related to the engine.

A server according to another preferred embodiment of the present invention receives positional information of a watercraft and data related to an engine of the watercraft from the watercraft and determines whether or not the positional information of the watercraft is genuine based on the data related to the engine.

A watercraft positional information managing method according to yet another preferred embodiment of the present invention includes outputting data related to an engine of a watercraft to a communicator of the watercraft by a controller configured or programmed to control the engine, detecting positional information of the watercraft, transmitting the detected positional information of the watercraft and the data related to the engine from the communicator to a server, receiving the positional information of the watercraft and the data related to the engine with the server, and determining whether or not the positional information of the watercraft is genuine with the server based on the data related to the engine.

Not only the positional information of the watercraft but also the data related to the engine are transmitted to the server. Then, it is possible to determine whether or not the positional information of the watercraft is genuine by using the data related to the engine. Thus, the GPS-based positional information is prevented from being falsified. For example, even if the transmission device per se, including the position detector, is removed from the in-situ watercraft and is then installed in another watercraft, the server cannot obtain the data related to the engine. Thus, it is possible to determine that the GPS-based positional information is not genuine. On the other hand, even if false data are outputted to the transmission device and are then transmitted therefrom to the server, it is possible to determine whether or not the GPS-based positional information is genuine by, for instance, a comparison between engine behaviors and watercraft positional behaviors. Thus, it is possible to determine whether or not the positional information of the watercraft is genuine such that the GPS-based positional information is prevented from being falsified.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be hereinafter explained with reference to drawings.

Figure 1:
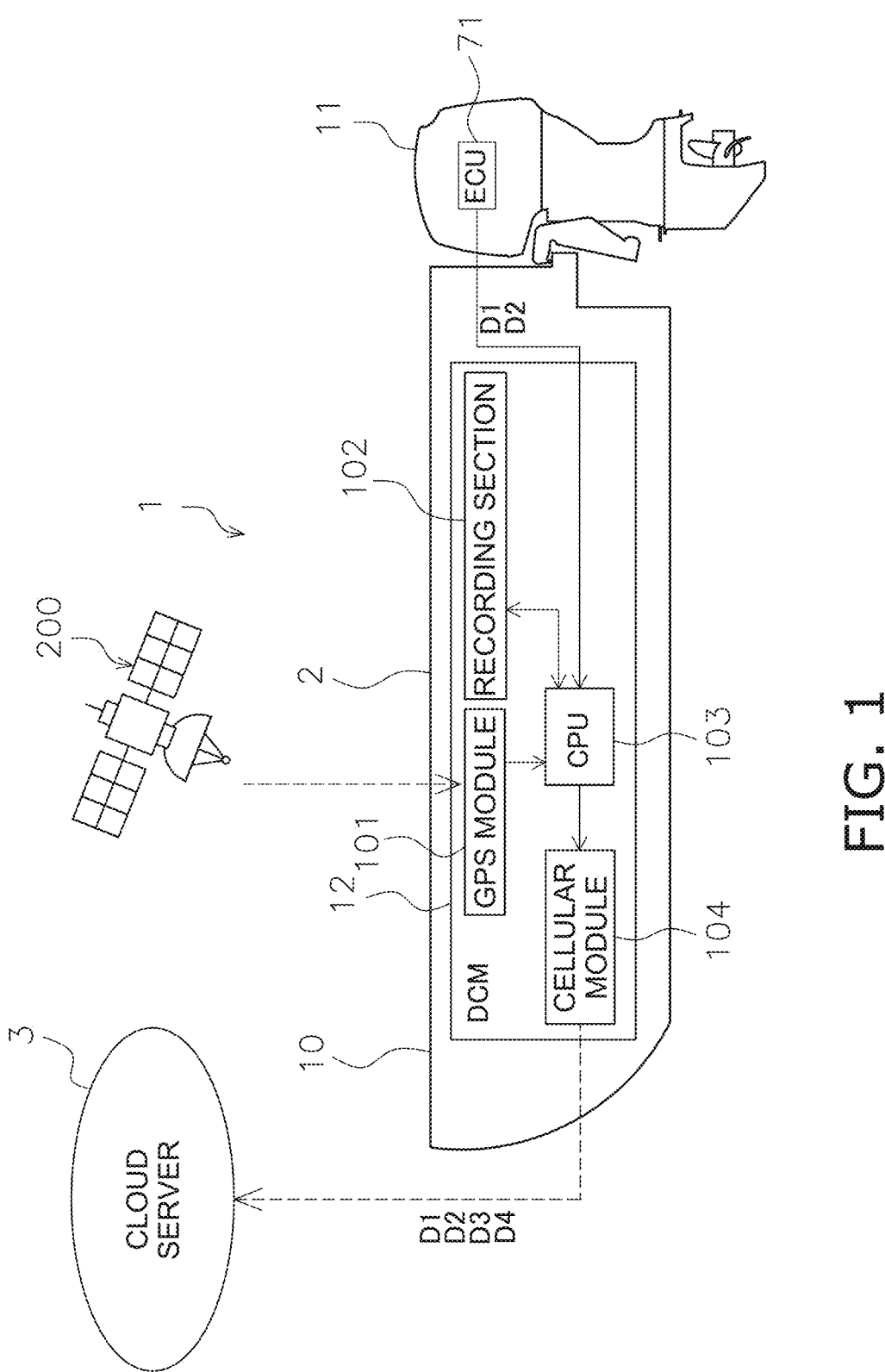
FIG. 1 is a schematic diagram of a watercraft positional information managing system according to a preferred embodiment of the present invention.

FIG. 1 is a diagram showing a watercraft positional information managing system 1 according to a preferred embodiment of the present invention. The watercraft positional information managing system 1 includes a watercraft 2 and a cloud server 3 (exemplary server). The watercraft 2 transmits the positional information of the watercraft 2 and data (information) related to an engine of a marine propulsion device 11 (exemplary propulsion device) to the cloud server 3. Then, the cloud server 3 determines whether or not the positional information of the watercraft 2 is genuine based on the received data related to the engine. The watercraft 2 includes a vessel body 10, the marine propulsion device 11, and a DCM (Data Communication Module) 12 (exemplary communication device or communicator). The data related to the engine of the marine propulsion device 11 are outputted to the DCM 12. The DCM 12 performs wireless communication with the cloud server 3.

Figure 2:
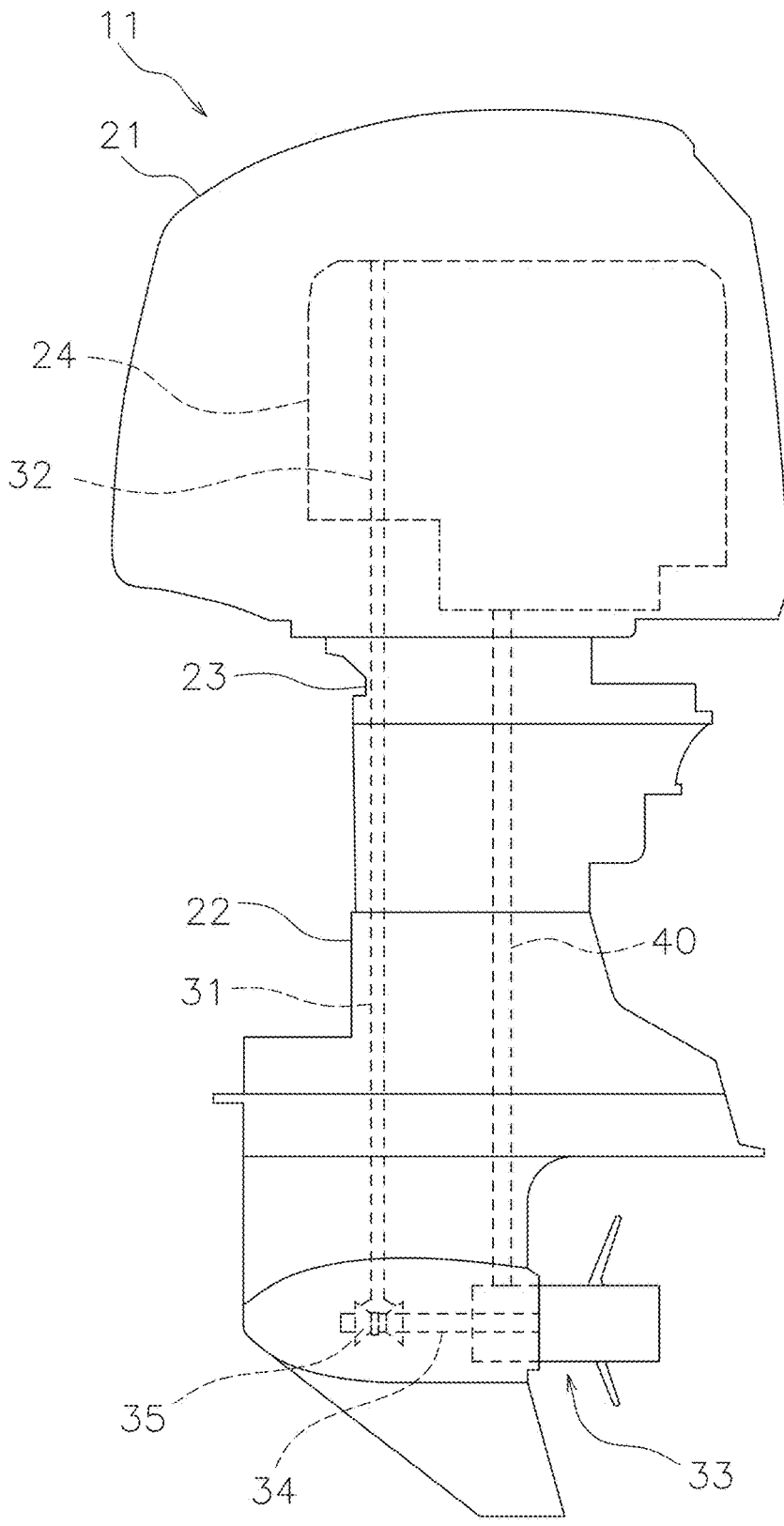
FIG. 2 is a side view of a marine propulsion device.

The marine propulsion device 11 is attached to the stern of the vessel body 10. The marine propulsion device 11 generates a thrust to propel the watercraft 2. In the present preferred embodiment, the marine propulsion device 11 is an outboard motor. FIG. 2 is a side view of the marine propulsion device 11.

The marine propulsion device 11 includes an upper casing 21, a lower casing 22, an exhaust guide section 23, and an engine 24. The upper casing 21, the lower casing 22, and the engine 24 are fixed to the exhaust guide section 23.

The engine 24 is disposed inside the upper casing 21. The engine 24 includes a crankshaft 32. A drive shaft 31 is disposed inside the lower casing 22. The drive shaft 31 is disposed along an up-and-down direction inside the lower casing 22. The drive shaft 31 is coupled to the crankshaft 32 of the engine 24. A propeller 33 is disposed at a lower portion of the lower casing 22. The propeller 33 is disposed below the engine 24. A propeller shaft 34 is coupled to the propeller 33. The propeller shaft 34 is disposed along a back-and-forth direction. The propeller shaft 34 is coupled to a lower portion of the drive shaft 31 through a forward/rearward moving switch section 35.

Figure 3A:
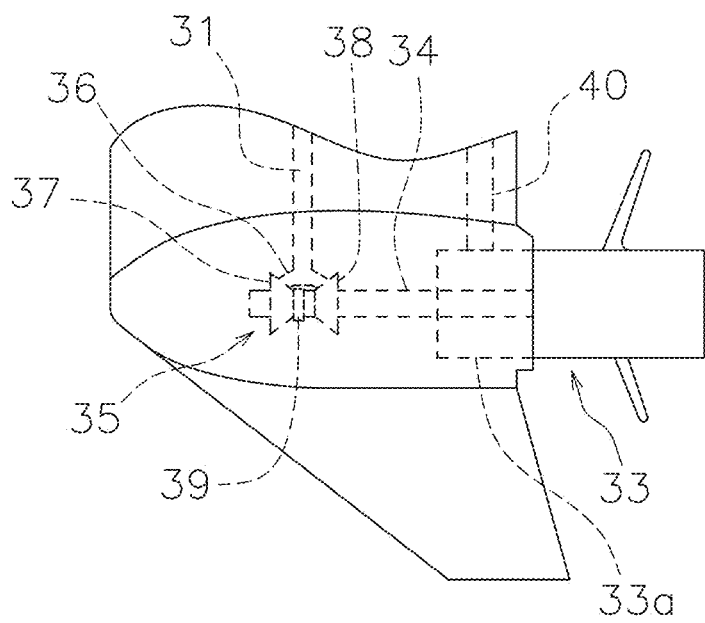
FIGS. 3A and 3B are side views of a configuration of a forward/rearward moving switch section in the marine propulsion device.
Figure 3B:
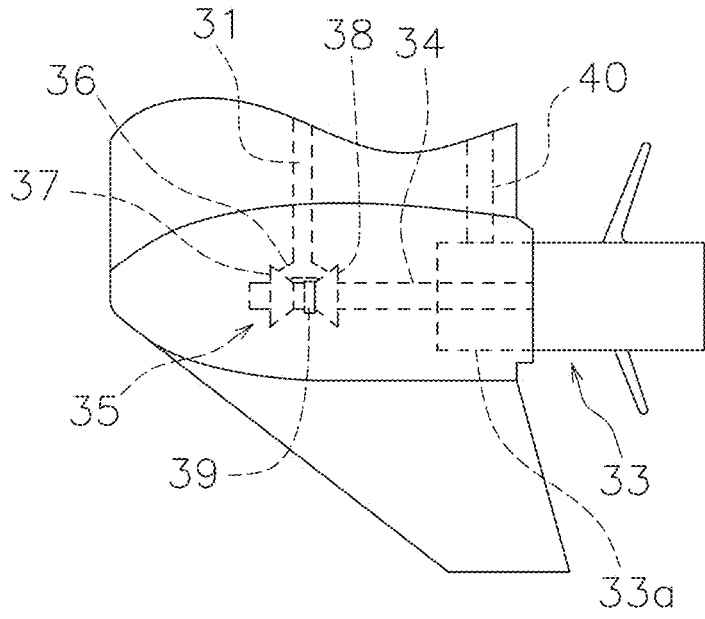

Diagrams in FIGS. 3A and 3B are closeup views of the forward/rearward moving switch section 35 shown in FIG. 2 and the vicinity thereof. The forward/rearward moving switch section 35 includes a pinion gear 36, a forward moving gear 37, a rearward moving gear 38, and a dog clutch 39. The pinion gear 36 is coupled to the drive shaft 31. The pinion gear 36 is meshed with the forward moving gear 37 and the rearward moving gear 38. The forward moving gear 37 and the rearward moving gear 38 are rotatable relative to the propeller shaft 34. The dog clutch 39 is attached to the propeller shaft 34 while being non-rotatable relative thereto. The dog clutch 39 is movable to a forward moving position, a rearward moving position, and a neutral position along the axial direction of the propeller shaft 34. The dog clutch 39 is moved to the forward moving position, the rearward moving position, and the neutral position by a shift actuator 77 (to be described). When the dog clutch 39 is located in the forward moving position shown in the diagram of FIG. 3A, the forward moving gear 37 and the propeller shaft 34 are fixed by the dog clutch 39 while being non-rotatable relative to each other. In this case, rotation of the drive shaft 31 is transmitted to the propeller shaft 34 through the forward moving gear 37. In other words, the forward/rearward moving switch section 35 is set to a forward moving state in which rotation of the drive shaft 31 is transmitted to the propeller 33 so as to rotate the propeller 33 in a direction corresponding to forward movement. Accordingly, the propeller 33 is rotated in the direction corresponding to the forward movement of the vessel body 10. On the other hand, when the dog clutch 39 is located in the rearward moving position shown in the diagram of FIG. 3B, the rearward moving gear 38 and the propeller shaft 34 are fixed by the dog clutch 39 while being non-rotatable relative to each other. In this case, rotation of the drive shaft 31 is transmitted to the propeller shaft 34 through the rearward moving gear 38. In other words, the forward/ rearward moving switch section 35 is set to a rearward moving state in which rotation of the drive shaft 31 is transmitted to the propeller 33 so as to rotate the propeller 33 in a direction corresponding to rearward movement. Accordingly, the propeller 33 is rotated in the direction corresponding to the rearward movement of the vessel body 10. When the dog clutch 39 is located in the neutral position between the forward moving position and the rearward moving position, each of the forward moving gear 37 and the rearward moving gear 38 is rotatable relative to the propeller shaft 34. In other words, rotation of the drive shaft 31 is not transmitted to the propeller shaft 34 and the propeller shaft 34 is idle.

In the marine propulsion device 11, a driving force generated by the engine 24 is transmitted to the propeller 33 through the drive shaft 31 and the propeller shaft 34. Accordingly, the propeller 33 is rotated in either the direction corresponding to forward movement or the direction corresponding to rearward movement. As a result, a thrust is generated to move forward or rearward the watercraft 2 to which the marine propulsion device 11 is attached.

As shown in FIG. 2, the marine propulsion device 11 is provided with an exhaust pathway 40 in the interior thereof. The exhaust pathway 40 extends downward from the engine 24. The exhaust pathway 40 is connected to an exhaust port of the engine 24 and, as shown in FIGS. 3A and 3B, is communicated with the internal space of a propeller boss 33a of the propeller 33. The exhaust gas from the engine 24 passes through the exhaust pathway 40 and is then discharged through the internal space of the propeller boss 33a into the water.

Figure 4:
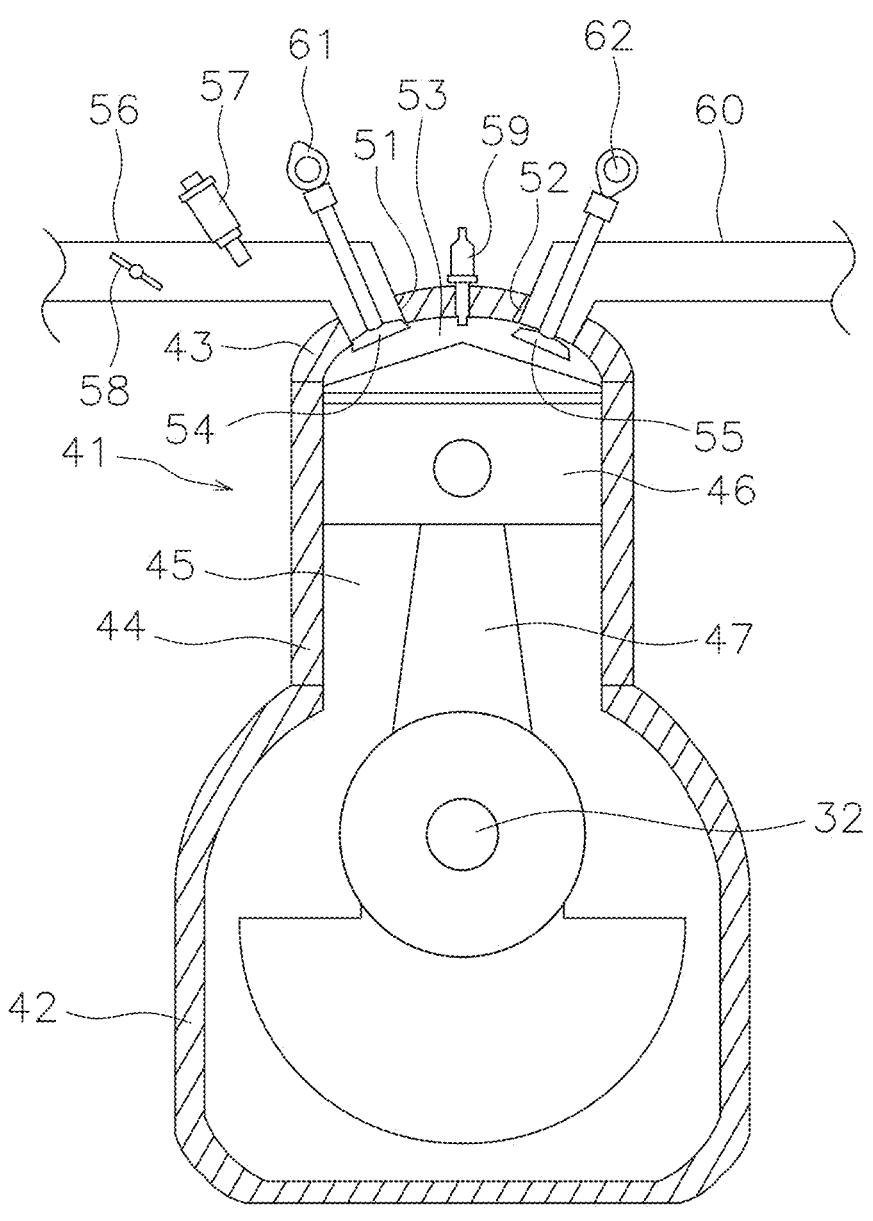
FIG. 4 is a diagram showing an internal configuration of an engine.

FIG. 4 is a schematic top view of an internal configuration of the engine 24. In the present preferred embodiment, the engine 24 includes a crankcase 42 and a plurality of cylinders 41, however, the number and the layout of the cylinders 41 may be set arbitrarily. The configuration of one cylinder 41 among the plurality of cylinders 41 of the engine 24 will be hereinafter explained based on FIG. 4, however, all the plurality of cylinders 41 of the engine 24 have a similar configuration to the cylinder 41 shown in FIG. 4. The cylinder 41 includes a cylinder head 43 and a cylinder block 44. The cylinder head 43 is attached to the cylinder block 44. The cylinder block 44 is provided with a cylinder chamber 45 in the interior thereof. A piston 46 is disposed inside the cylinder chamber 45 while being movable in the axial direction of the cylinder chamber 45. A connecting rod 47 is coupled at one end thereof to the piston 46. The connecting rod 47 is coupled at the other end thereof to the crankshaft 32.

The cylinder head 43 includes an intake port 51, an exhaust port 52, and a combustion chamber 53. Each of the intake port 51 and the exhaust port 52 communicates with the combustion chamber 53. The intake port 51 is opened and closed by an intake valve 54. The exhaust port 52 is opened and closed by an exhaust valve 55. An intake pipe 56 is connected to the intake port 51. A fuel injection device 57 is attached to the intake pipe 56. The fuel injection device 57 injects a fuel to be supplied to the combustion chamber 53. A throttle valve 58 is disposed in the intake pipe 56. The amount of mixture gas to be fed to the combustion chamber 53 is regulated by changing the opening degree of the throttle valve 58. An exhaust pipe 60 is connected to the exhaust port 52. An ignition device 59 is attached to the cylinder head 43. The ignition device 59 is inserted into the combustion chamber 53 and ignites the fuel.

The intake valve 54 is biased in a direction corresponding to closing the intake port 51 by an urging member such as a coil spring or so forth (not shown in the drawings). The intake valve 54 is opened and closed when an intake camshaft 61 is rotated. The exhaust valve 55 is biased in a direction corresponding to closing the exhaust port 52 by an urging member such as a coil spring or so forth (not shown in the drawings). The exhaust valve 55 is opened and closed when an exhaust camshaft 62 is rotated.

Figure 5:
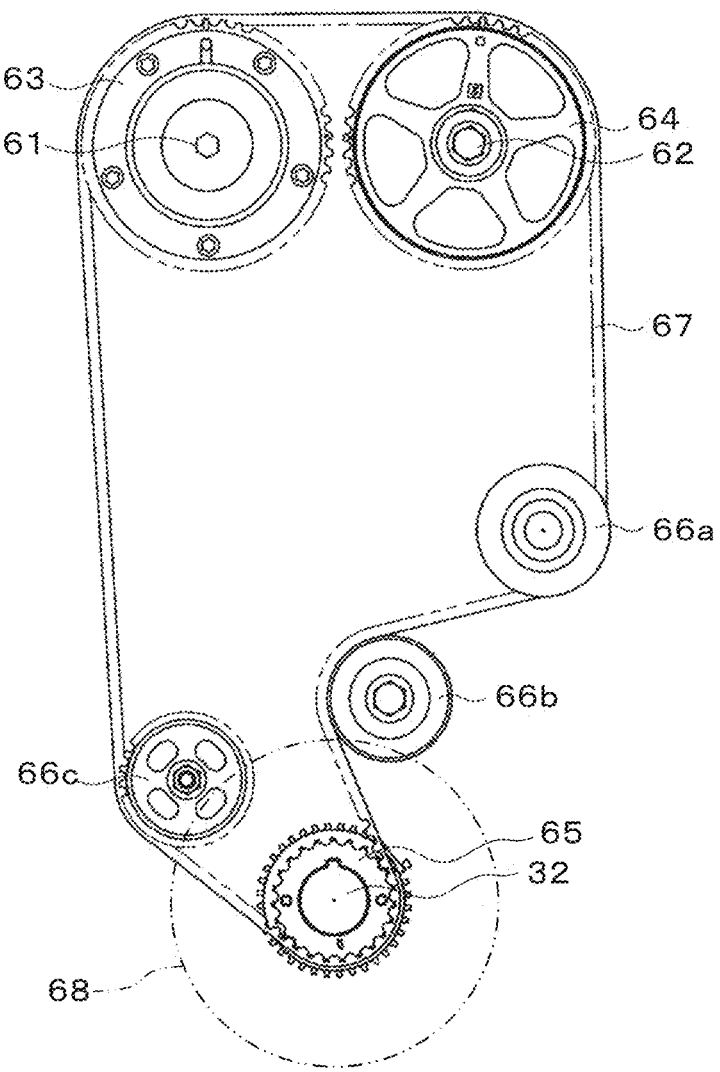
FIG. 5 is a diagram showing a configuration of a drive mechanism for camshafts.

FIG. 5 is a top view of a drive mechanism to rotate the intake camshaft 61 and the exhaust camshaft 62. The drive mechanism is disposed on, for instance, the top surface of the engine 24. As shown in FIG. 5, an intake cam pulley 63 is fixed to an end of the intake camshaft 61. An exhaust cam pulley 64 is fixed to an end of the exhaust camshaft 62. A crank pulley 65 is fixed to the crankshaft 32. Moreover, a cam belt 67 is wrapped and stretched over the intake cam pulley 63, the exhaust cam pulley 64, the crank pulley 65, and a plurality of intermediate pulleys 66a, 66b, and 66c. The driving force of the crankshaft 32 is transmitted to the intake camshaft 61 and the exhaust camshaft 62 through the cam belt 67. It should be noted that a flywheel 68 is fixed to an end of the crankshaft 32.

Figure 6:
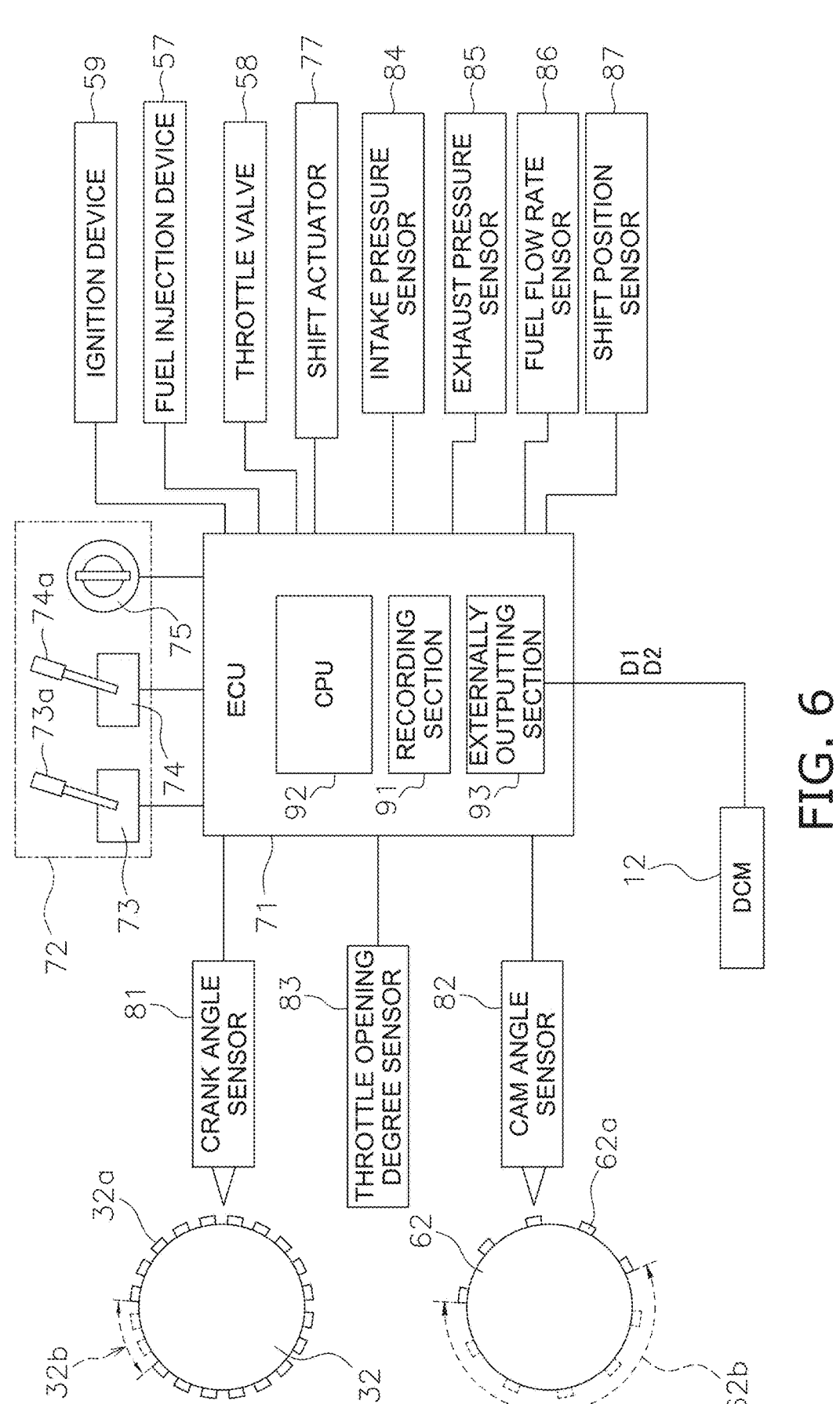
FIG. 6 is a schematic diagram showing a configuration of a control system of the engine.

FIG. 6 is a schematic diagram of a configuration of a control system of the engine 24. The engine 24 is controlled by an ECU (Engine Control Unit) 71 (exemplary controller). An operating device 72 and a variety of sensors 81 to 87 to detect a variety of data related to the engine 24 are connected to the ECU 71.

The operating device 72 includes a throttle operating device 73, a shift operating device 74, and a start/stop operating device 75 to start and stop of the engine 24. The throttle operating device 73 includes, for instance, a throttle operating member 73a such as a throttle lever. The throttle operating device 73 inputs an operating signal to control an output of the engine 24 to the ECU 71 in accordance with an operation of the throttle operating member 73a. The shift operating device 74 includes, for instance, a shift operating member 74a such as a shift lever. The shift operating device 74 inputs an operating signal to switch forward movement and rearward movement of the watercraft 2 to the ECU 71 in accordance with an operation of the shift operating member 74a. Specifically, the shift operating member 74a is operable to any one of shift positions composed of a forward moving position, a rearward moving position, and a neutral position. An operating signal, corresponding to one selected from the shift position, is inputted the ECU 71. The start/stop operating device 75 to start and stop of the engine 24 includes, for instance, a key switch and inputs an operating signal to start or stop the engine 24 to the ECU 71.

The sensors 81 to 87, connected to the ECU 71, include a crank angle sensor 81 (exemplary rotational speed detecting sensor), a cam angle sensor 82, a throttle opening degree sensor 83, an intake pressure sensor 84, an exhaust pressure sensor 85, a fuel flow rate sensor 86, and a shift position sensor 87.

The crank angle sensor 81 detects the angle of rotation of the crankshaft 32. The crank angle sensor 81 includes a magnetic sensor, and as shown in FIG. 6, detects passage of a plurality of protrusions 32a of the crankshaft 32. It should be noted that in FIG. 6, reference sign 32a is assigned to only a portion of the plurality of protrusions 32a. The crankshaft 32 is provided with the plurality of protrusions 32a regularly aligned on the surface thereof. It should be noted that the crankshaft 32 is provided with a missing region 32b on the surface thereof. The protrusions 32a are not provided in the missing region 32b and the interval between a pair of adjacent protrusions 32a defining the missing region 32b is different from that between each other pair of adjacent protrusions 32a.

A magnetic field is strengthened when the protrusions 32a pass through a position opposed to the crank angle sensor 81, thus, periodic spikes are formed in the waveform of the detection signal. By contrast, when the missing region 32b passes through the position opposed to the crank angle sensor 81, such spikes are not formed in the waveform of the detection signal and the signal strength of the detection signal is kept constant. Because of this, crank spike regions, in each of which the periodic spikes are formed, and crank flat regions, in each of which the periodic spikes are not formed and the signal strength is kept constant (i.e., the waveform is flat), alternately appear in the waveform of the detection signal of the crank angle sensor 81. As a result of detecting these regions, the speed of rotation and the angle of rotation of the crankshaft 32 are detected.

The cam angle sensor 82 detects the angle of rotation of the exhaust camshaft 62. The cam angle sensor 82 includes a magnetic sensor and detects passage of a plurality of protrusions 62a provided on the exhaust camshaft 62. It should be noted that in FIG. 6, reference sign 62a is assigned to only a portion of the plurality of protrusions 62a. The exhaust camshaft 62 is provided with the plurality of protrusions 62a regularly aligned on the surface thereof. It should be noted that the exhaust camshaft 62 is provided with a missing region 62b on the surface thereof. The protrusions 62a are not provided in the missing region 62b and the interval between a pair of adjacent protrusions 62a defining the missing region 62b is different from that between each other pair of adjacent protrusions 62a. When the engine 24 is started, the crankshaft 32, the intake camshaft 61, and the exhaust camshaft 62 are driven. Accordingly, the crank angle sensor 81 detects passage of the protrusions 32a of the crankshaft 32. On the other hand, the cam angle sensor 82 detects passage of the protrusions 62a of the exhaust camshaft 62. The crank angle sensor 81 and the cam angle sensor 82 transmit the detection signals to the ECU 71.

As seen in the waveform of the detection signal of the crank angle sensor 81, cam spike regions, in each of which the periodic spikes continue due to passage of the protrusions 62a, and cam flat regions, in each of which a flat waveform continues due to passage of the missing region 62b, alternately appear in the waveform of the detection signal of the cam angle sensor 82. As a result of detecting these regions, the speed of rotation and the angle of rotation of the exhaust camshaft 62 are detected.

The throttle opening degree sensor 83 (exemplary opening degree sensor) detects the opening degree of the throttle valve 58. The intake pressure sensor 84 detects the pressure inside the intake pipe 56. The exhaust pressure sensor 85 detects the pressure inside the exhaust pipe 60. The fuel flow rate sensor 86 detects the flow rate of the fuel to be supplied to the engine 24. The shift position sensor 87 detects to which of the shift states the forward/rearward moving switch section 35 is set among the forward moving state, the rearward moving state, and the neutral state. The shift position sensor 87 detects the shift state of the forward/rearward moving switch section 35 by detecting, for instance, the position of the dog clutch 39 described above. Each of the sensors inputs a detection signal to the ECU 71.

The ECU 71 includes a recording section 91, a CPU (Central Processing Unit) 92, and an external outputting section 93. The recording section 91 is a recording device that electronic data are writable therein and readable therefrom. The recording section 91 includes a memory such as a RAM (Random Access Memory) or a ROM (Read Only Memory) and an auxiliary storage device such as an HDD (Hard Disk Drive) or an SSD (Solid State Drive). The recording section 91 stores control programs corresponding to predetermined operating states.

The recording section 91 records the detection signals outputted from the sensors 81 to 87. The recording section 91 records an engine serial number D1 of the engine 24 and an encryption key associated with the engine serial number D1 of the engine 24. The engine serial number and the encryption key associated therewith are written in the ECU 71 during manufacture of the engine 24. It should be noted that the information, with which the encryption key is associated, may not be limited to the engine serial number and is not particularly limited to specific information as long as the information is unique to the engine.

The recording section 91 records data related to the engine (engine related data D2). The engine related data D2 include an engine operating time, the fuel flow rate, the engine rotational speed, and the throttle opening degree.

The CPU 92, which includes a processor, determines the present operating state based on the signals inputted thereto from the variety of sensors 81 to 87 and the operating device 72. Under the control program corresponding to the present operating state, the CPU 92 controls actions of the ignition device 59, the fuel injection device 57, and the throttle valve 58. The ECU 71 controls the shift actuator 77 based on the operating signal inputted thereto from the shift operating device 74. The shift actuator 77 includes, for instance, a driver such as a motor. The shift actuator 77 is controlled by the ECU 71 to move the dog clutch 39 described above to any one of the forward moving position, the rearward moving position, and the neutral position.

The CPU 92 stores a cumulative operating time of the engine 24, inputted thereto at predetermined intervals of time, in the recording section 91. The engine operating time is a cumulative operating time of the engine 24 since manufacture of the engine 24.

The CPU 92 records the detection signal, inputted thereto from the crank angle sensor 81, in the recording section 91 as the speed of rotation of the engine 24.

The CPU 92 records the detection signal, inputted thereto from the throttle opening degree sensor 83, in the recording section 91 as the throttle opening degree.

The ECU 71 encrypts the engine related data D2 with the encryption key associated with the engine serial number D1. The ECU 71 outputs the engine serial number D1 and the encrypted engine related data D2 to the DCM 12 through the external outputting section 93.

The external outputting section 93 includes an interface to perform electronic data communication with the DCM 12. The external outputting section 93 transmits the engine serial number D1 and the encrypted engine related data D2 to the DCM 12. The external outputting section 93 in the ECU 71 is electrically connected to the DCM 12 through wired or wireless communication.

The DCM 12 is disposed in the watercraft 2 and is connected to the ECU 71. As shown in FIG. 1, the DCM 12 includes a GPS (Global Positioning System) module 101 (exemplary position detector), a recording section 102, a CPU (Central Processing Unit) 103, and a cellular module 104.

The GPS module 101 receives a GPS signal from a GPS satellite 200 and outputs positional information D3 of the watercraft 2 to the CPU 103. The recording section 102 includes a memory such as a RAM (Random Access Memory) or a ROM (Read Only Memory) and an auxiliary storage device such as an HDD (Hard Disk Drive) or an SSD (Solid State Drive). The recording section 102 stores control programs corresponding to predetermined operating states. The recording section 102 stores a DCM serial number D4. The DCM serial number is a product number assigned to the DCM 12 during manufacture of the DCM 12. It should be noted that the information related to the DCM 12 is not particularly limited to the serial number of the DCM 12 as long as the information is unique to the DCM 12.

The CPU 103, which includes a processor, operates under the control programs stored in the recording section 102. The CPU 103 records the engine serial number D1 and the encrypted engine related data D2, both of which are inputted thereto from the ECU 71, in the recording section 102.

The CPU 103 records the positional information D3, inputted thereto from the GPS module 101, in the recording section 102. It should be noted that the encrypted engine related data D2 may be obtained by the DCM 12 at intervals of time equal to or different from those at which the positional information D3 is obtained by the DCM 12. When a clock time, at which the encrypted engine related data D2 have been obtained, and a clock time, at which the positional information D3 has been obtained, fall in a predetermined range of clock time, the CPU 103 may record the encrypted engine related data D2 and the positional information D3 in the recording section 102, while the encrypted engine related data D2 and the positional information D3 are associated with each other.

The CPU 103 transmits the engine serial number D1, the encrypted engine related data D2, the positional information D3, and the DCM serial number D4, all of which have been recorded in the recording section 102, to the cloud server 3 through the cellular module 104 at predetermined intervals of time. For example, data are outputted from the ECU 71 to the DCM 12 every several minutes and are recorded in the recording section 102. Then, the data are transmitted from the DCM 12 to the cloud server 3 every several minutes or every several hours, for example. Likewise, the positional information D3 outputted from the GPS module 101 may be recorded in the recording section 102 every several minutes, for example.

The cellular module 104 is communicable with the cloud server 3 through a mobile communication network. The mobile communication network is, for instance, a network of a 3G, 4G, or 5G mobile communication system.

The cloud server 3 receives the engine serial number D1, the encrypted engine related data D2, the positional information D3, and the DCM serial number D4 from the DCM 12. The cloud server 3 stores a plurality of engine serial numbers and a plurality of encryption keys associated with the engine serial numbers on a one-to-one basis as a plurality of pairs of engine serial number and encryption key with respect to a plurality of watercraft. The cloud server 3 decrypts the encrypted engine related data D2 with the encryption key associated with the received engine serial number D1.

The cloud server 3 determines whether or not the positional information D3 of the watercraft 2 is genuine based on the engine related data D2 received from the DCM 12.

Specifically, the cloud server 3 determines that the positional information D3 of the watercraft 2 is genuine when the encrypted engine related data D2 can be decrypted with the encryption key associated with the engine serial number D1. The success of decrypting the encrypted engine related data D2 indicates that the DCM 12 is connected to the regular ECU 71. Thus, it is possible to determine that the positional information D3 obtained by the GPS module 101 installed in the DCM 12 is genuine as well.

When the engine related data D2 include the engine operating time, the cloud server 3 is able to determine whether or not the positional information D3 of the watercraft 2 is genuine based on whether or not the engine operating time has increased with a change in position of the watercraft 2. For example, comparison is made between both the positional information D3 and the engine operating time obtained at predetermined timing and those obtained later than the predetermined timing. Then, when it can be determined that change in position of the watercraft 2 is lower relative to an increase in operating time of the engine 24, the cloud server 3 determines that the positional information D3 is not genuine.

When the engine related data D2 include the engine rotational speed, the cloud server 3 determines whether or not the positional information D3 is genuine based on whether or not the engine rotational speed changes with a change in position of the watercraft 2. For example, the cloud server 3 determines that the positional information D3 is not genuine when it can be determined that a change in position of the watercraft 2 in a predetermined period of time is lower relative to either a change in engine rotational speed or an average or cumulative value of the engine rotational speed in the predetermined period of time.

When the engine related data D2 include the engine throttle opening degree, the cloud server 3 determines whether or not the positional information D3 of the watercraft 2 is genuine based on whether or not the throttle opening degree changes with a change in position of the watercraft 2. For example, the cloud server 3 determines that the positional information D3 is not genuine when it can be determined that change in position of the watercraft 2 in a predetermined period of time is lower relative to either a change in throttle opening degree or an average or cumulative value of the throttle opening degree in the predetermined period of time.

When the engine related data D2 include the fuel flow rate, the cloud server 3 determines whether or not the positional information D3 of the watercraft 2 is genuine based on whether or not the amount of used fuel changes with a change in position of the watercraft 2. For example, the cloud server 3 determines that the positional information D3 is not genuine when it can be determined that a change in position of the watercraft 2 in a predetermined period of time is lower relative to either a change in the amount of used fuel or an average or cumulative value of the amount of used fuel in the predetermined period of time.

The cloud server 3 determines that the positional information D3 is not genuine when the combination of the engine serial number D1 and the DCM serial number D4, received by the cloud server 3, is not matched with that stored in the cloud server 3. The cloud server 3 stores a plurality of combinations of serial numbers regarding the engine 24 and the DCM 12 (both of which are installed in each watercraft 2) with respect to a plurality of watercraft 2. When the combination of the engine serial number D1 and the DCM serial number D4 received by the cloud server 3 is different from that stored tin the cloud server 3, the cloud server 3 can determine that a misconduct has been done as follows: For instance, the positional information has been falsified by installing the DCM 12 in a watercraft different from the in-situ watercraft 2.

Figure 7:
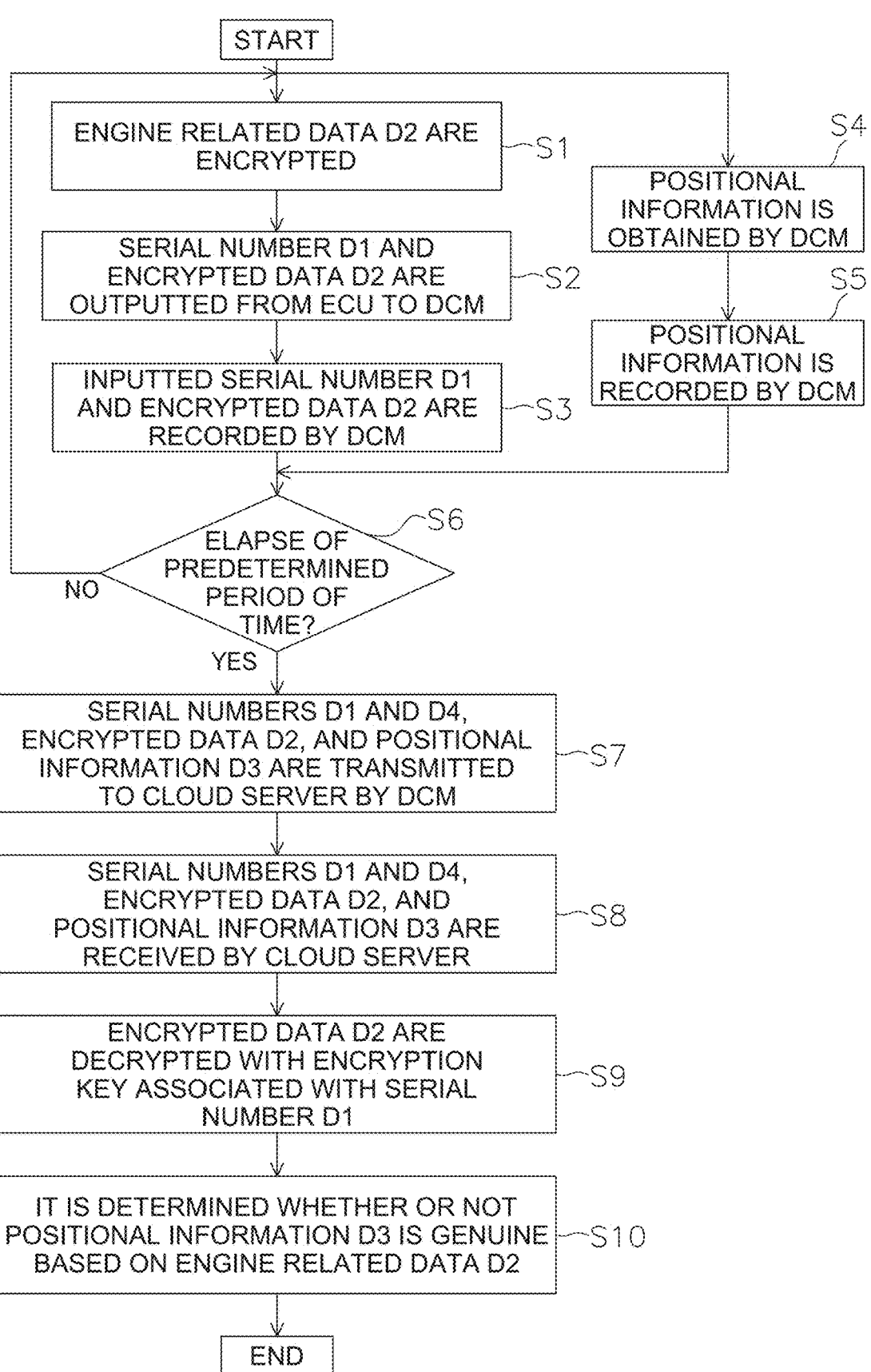
FIG. 7 is a flowchart showing a watercraft positional information managing method according to a preferred embodiment of the present invention.

Next, a watercraft positional information managing method according to a preferred embodiment of the present invention will be explained. FIG. 7 is a flowchart showing the watercraft positional information managing method according to the present preferred embodiment.

In step S1, the CPU 92 in the ECU 71 encrypts the engine related data D2 with the encryption key associated with the serial number of the engine 24. The encryption key has been recorded in the recording section 91 in advance.

In step S2, the engine serial number D1 and the encrypted engine related data D2 are outputted from the ECU 71 to the DCM 12.

In step S3, the engine serial number D1 and the encrypted engine related data D2 are inputted to the DCM 12. Then, the DCM 12 records the data D1 and D2 in the recording section 102.

In parallel with steps S1 to S3 described above, the GPS module 101 in the DCM 12 receives the positional information D3 from the GPS satellite in step S4. Then, in step S5, the positional information D3 is recorded in the recording section 102 in the DCM 12.

In step S6, the DCM 12 determines whether or not a predetermined period of time has elapsed. The control flow in steps S1 to S3 and that in steps S4 and S5 are repeated respectively until the predetermined period of time elapses. With repetition of steps S1 to S3, the encrypted engine related data D2 are recorded in the recording section 102 in the DCM 12 a plurality of times in a time-series manner as a plurality of data sets. With repetition of steps S4 and S5, the positional information D3 is recorded in the recording section 102 in the DCM 12 a plurality of times in a time-series manner as a plurality of data sets. The encrypted engine related data D2 may be obtained at intervals of time equal to or different from those at which the positional information D3 is obtained. When a clock time, at which the encrypted engine related data D2 have been obtained, and a clock time, at which the positional information D3 has been obtained, fall in a predetermined range of clock time, the CPU 103 may record the encrypted engine related data D2 and the positional information D3 in the recording section 102, while the encrypted engine related data D2 and the positional information D3 are associated with each other.

In step S7, the DCM 12 transmits the engine serial number D1, the encrypted engine related data D2, the positional information D3, and the DCM serial number D4 stored in the recording section 102 to the cloud server 3.

In step S8, the cloud server 3 receives the engine serial number D1, the DCM serial number D4, the encrypted engine related data D2, and the positional information D3.

In step S9, the cloud server 3 decrypts the encrypted engine related data D2 with the encryption key associated with the engine serial number D1.

In step S10, the cloud server 3 determines whether or not the positional information D3 is genuine based on the decrypted engine related data D2, then, the control steps end. It should be noted that as described above, determination regarding whether or not the engine related data D2 can be encrypted may be also used as the basis for determination regarding whether or not the positional information D3 is genuine.

It should be noted that, when determining that the positional information D3 is not genuine, the cloud server 3 may record the watercraft 2 relevant to the positional information D3 and may specify a user who has used the watercraft 2. Besides or alternatively, when determining that the positional information D3 is not genuine, the cloud server 3 may transmit a warning signal to the DCM 12 so as to display a warning on a monitor or so forth installed in the watercraft 2.

The watercraft positional information managing system 1 according to a preferred embodiment of the present invention has the following features.

Not only the positional information D3 of the watercraft 2 but also the engine related data D2 are transmitted to the cloud server 3. Then, it is possible to determine whether or not the positional information D3 of the watercraft 2 is genuine by using the engine related data D2. Thus, the GPS-based positional information is prevented from being falsified. For example, even if the DCM 12 per se, including the GPS module, is removed from the in-situ watercraft 2 and is then installed in another watercraft, the cloud server 3 cannot obtain the engine related data D2. Thus, it is possible to determine that the positional information D3 is not genuine. On the other hand, even if false data are outputted to the DCM 12 and then transmitted therefrom to the cloud server 3, it is possible to determine whether or not the positional information D3 is genuine by, for instance, a comparison between engine behaviors and watercraft positional behaviors. Thus, it is possible to determine whether or not the watercraft positional information D3 is genuine such that the GPS-based positional information D3 is prevented from being falsified.

The ECU 71 encrypts the engine related data D2 and outputs the encrypted engine related data D2 to the DCM 12. The DCM 12 transmits the watercraft positional information D3 and the encrypted engine related data D2 to the cloud server 3. The cloud server 3 determines that the watercraft positional information D3 is genuine when the encrypted engine related data D2 can be decrypted. The success of decrypting the engine related data D2 transmitted from the watercraft 2 indicates that the DCM 12 is connected to the regular ECU 71. Thus, it is possible to determine that the positional information D3, obtained by the GPS module 101 installed in the DCM 12, is genuine as well.

The ECU 71 encrypts the engine related data D2 with the encryption key related to the information unique to the engine 24 and outputs the encrypted engine related data D2 and the information unique to the engine to the DCM 12. The DCM 12 transmits the watercraft positional information D3, the encrypted engine related data D2, and the information unique to the engine to the cloud server 3. The cloud server 3 receives the watercraft positional information D3, the encrypted engine related data D2, and the information unique to the engine and decrypts the engine related data D2 with the encryption key related to the information unique to the engine. Thus, the success of decrypting the engine related data D2 indicates that the DCM 12 is connected to the regular ECU 71. Thus, it is possible to determine that the positional information D3, obtained by the GPS module 101 installed in the DCM 12, is genuine as well. The encryption key associated with the information unique to the engine is herein used, thus, data falsification is more reliably prevented than when a common encryption key is used.

The information unique to the engine 24 is a serial number assigned to the engine 24. For example, a serial number set during manufacture of the engine can be used as the information unique to the engine. Because of this, unique encryption keys can be set to the engines, respectively.

The engine related data D2 include the engine operating time. The cloud server 3 determines whether or not the watercraft positional information D3 is genuine based on whether or not the engine operating time has increased with a change in position of the watercraft 2. The cloud server 3 is able to determine that the positional information D3 is not genuine, for instance, when a change in position of the watercraft 2 is lower relative to increase in engine operating time.

The engine related data D2 include the engine rotational speed. The cloud server 3 determines whether or not the watercraft positional information D3 is genuine based on whether or not the engine rotational speed changes with a change in position of the watercraft 2. The cloud server 3 is able to determine that the positional information D3 is not genuine, for instance, when a change in position of the watercraft 2 in a predetermined period of time is lower relative to either a change in engine rotational speed or an average or cumulative value of the engine rotational speed in the predetermined period of time.

The engine related data D2 include the throttle opening degree. The cloud server 3 determines whether or not the watercraft positional information D3 is genuine based on whether or not the throttle opening degree changes with a change in position of the watercraft 2. The cloud server 3 is able to determine that the positional information D3 is not genuine, for instance, when a change in position of the watercraft 2 in a predetermined period of time is lower relative to either a change in throttle opening degree or an average or cumulative value of the throttle opening degree in the predetermined period of time.

The DCM 12 transmits not only the engine serial number D1, the engine related data D2, and the positional information D3, but also the DCM serial number D4 to the cloud server 3. The cloud server 3 determines that the positional information D3 is not genuine when the combination of the engine serial number D1 and the DCM serial number D4, received by the cloud server 3, is not matched with that stored in the cloud server 3. Accordingly, the cloud server 3 can determine that a misconduct has been done as follows: For instance, the positional information has been falsified by installing the DCM 12 in a watercraft different from the in-situ watercraft 2. The cloud server 3 receives the positional information D3 of the watercraft 2 and the data D2 related to the engine 24 of the watercraft 2 from the watercraft 2, and then, determines whether or not the positional information D3 of the watercraft 2 is genuine based on the engine related data D2. Accordingly, it is possible to determine whether or not the watercraft positional information D3 is genuine such that the GPS-based positional information is prevented from being falsified.

Preferred embodiments of the present invention have been explained above. However, the present invention is not limited to the preferred embodiments described above, and a variety of changes can be made without departing from the gist of the present invention.

In a preferred embodiment described above, the engine related data D2 are encrypted, then, the encrypted engine related data D2 are transmitted to the cloud server 3. However, the engine related data D2 may not be encrypted.

Even in this case, it is possible to determine whether or not the watercraft positional information D3 is genuine based on the engine related data D2.

In a preferred embodiment described above, the encryption key used therein is associated with the serial number exemplified as the information unique to the engine. However, the configuration of the encryption key may not be limited to this. For example, a single encryption key may be used in common among all the watercraft. Alternatively, a plurality of encryption keys may be set and used depending on the types of engines.

In a preferred embodiment described above, the detection signal of the crank angle sensor 81 is recorded as the engine rotational speed in the recording section 91. However, the engine rotational speed may not be limited to this. The crankshaft 32 and the exhaust camshaft 62 are rotated in conjunction with each other. Because of this, instead of the detection signal of the crank angle sensor 81, the detection signal of the cam angle sensor 82 may be recorded as the engine rotational speed in the recording section 91.

In a preferred embodiment described above, the engine related data D2 include the engine operating time, the fuel flow rate, the engine rotational speed, and the throttle opening degree. However, the engine related data D2 may not include all of the above. What is necessary for the engine related data D2 is to include at least one of the above.

In a preferred embodiment described above, in step S2, the ECU 71 outputs the engine serial number D1 together with the encrypted engine related data D2 to the DCM 12. However, the configuration of outputting the engine serial number D1 may not be limited to this. The engine serial number D1 may not be outputted every time together with the encrypted engine related data D2. What is necessary is to output the engine serial number D1 to the DCM 12 once and then cause the DCM 12 to record the engine serial number D1.

In a preferred embodiment described above, the DCM 12 transmits the DCM serial number D4 to the cloud server 3. However, the DCM 12 may not transmit the DCM serial number D4 to the cloud server 3.

In a preferred embodiment described above, the watercraft positional information managing system 1 includes the cloud server 3. However, the watercraft positional information managing system 1 may not necessarily include the cloud server 3 but may include a physical server.

According to preferred embodiments of the present invention, it is possible to provide watercraft positional information managing systems, servers, and watercraft positional information managing methods in which GPS-based positional information is prevented from being falsified.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft positional information managing system comprising:
  a server; and
  a watercraft including a propulsion device and a communicator to communicate with the server; wherein
  the communicator includes a position detector to detect positional information of the watercraft;
  the propulsion device includes an engine and a controller configured or programmed to control the engine and output data related to the engine to the communicator;

the communicator is configured or programmed to transmit the data related to the engine and the positional information of the watercraft to the server at predetermined intervals of time;
  the server is configured or programmed to receive the data related to the engine and the positional information of the watercraft and to determine whether or not the positional information of the watercraft is genuine based on the data related to the engine in a predetermined period of time;
  the server is configured or programmed to record the watercraft whose positional information is not genuine, or transmit a warning signal to the communicator of the watercraft, when it is determined that the positional information of the watercraft is not genuine; and
  the data related to the engine includes an operating time of the engine, a fuel flow rate, a speed of rotation of the engine, or a throttle opening degree.

2. The watercraft positional information managing system according to claim 1, wherein
  the controller is configured or programmed to encrypt the data related to the engine and output the encrypted data related to the engine to the communicator;
  the communicator is configured or programmed to transmit the encrypted data related to the engine and the positional information of the watercraft to the server; and
  the server is configured or programmed to determine that the positional information of the watercraft is genuine when the encrypted data related to the engine are successfully decrypted.

3. The watercraft positional information managing system according to claim 1, wherein
  the controller is configured or programmed to encrypt the data related to the engine with an encryption key related to information unique to the engine, and output the encrypted data related to the engine and the information unique to the engine to the communicator;
  the communicator is configured or programmed to transmit the positional information of the watercraft, the encrypted data related to the engine, and the information unique to the engine to the server; and
  the server is configured or programmed to receive the positional information of the watercraft, the encrypted data related to the engine, and the information unique to the engine, and to decrypt the encrypted data related to the engine with the encryption key related to the information unique to the engine.

4. The watercraft positional information managing system according to claim 3, wherein the information unique to the engine is a serial number assigned to the engine.

5. The watercraft positional information managing system according to claim 1, wherein
  the data related to the engine include the operating time of the engine; and
  the server is configured or programmed to determine whether or not the positional information of the watercraft is genuine based on whether or not the operating time of the engine increases with a change in position of the watercraft.

6. The watercraft positional information managing system according to claim 1, wherein
  the propulsion device further includes a rotational speed detecting sensor to detect the speed of rotation of the engine;
  the data related to the engine include the speed of rotation of the engine; and the server is configured or programmed to determine whether or not the positional information of the watercraft is genuine based on whether or not the speed of rotation of the engine changes with a change in position of the watercraft.

7. The watercraft positional information managing system according to claim 1, wherein the propulsion device further includes an opening degree sensor to detect the throttle opening degree;

the data related to the engine include the throttle opening degree; and the server is configured or programmed to determine whether or not the positional information of the watercraft is genuine based on whether or not the throttle opening degree changes with a change in position of the watercraft.

8. The watercraft positional information managing system according to claim 1, wherein the controller is configured or programmed to output information unique to the engine to the communicator;

the communicator is configured or programmed to transmit not only the data related to the engine inputted thereto, the positional information of the watercraft, and the information unique to the engine, but also information unique to the communicator to the server;

the server is configured or programmed to store in advance a combination of the information unique to the engine and the information unique to the communicator associated with each other; and the server is configured or programmed to determine that the positional information of the watercraft is not genuine when both the information unique to the engine and the information unique to the communicator received by the server are not matched with the combination of the information unique to the engine and the information unique to the communicator stored in advance in the server.

9. A server configured or programmed to:

receive positional information of a watercraft and data related to an engine of the watercraft from the watercraft at predetermined intervals of time;

determine whether or not the positional information of the watercraft is genuine based on the data related to the engine in a predetermined period of time; and when it is determined that the positional information of the watercraft is not genuine, record the watercraft whose positional information is not genuine, or transmit a warning signal; wherein the data related to the engine includes an operating time of the engine, a fuel flow rate, a speed of rotation of the engine, or a throttle opening degree.

10. A watercraft positional information managing method comprising:

outputting data related to an engine of a watercraft to a communicator of the watercraft by a controller configured or programmed to control the engine;

detecting positional information of the watercraft;

transmitting the detected positional information of the watercraft and the data related to the engine from the communicator to a server at predetermined intervals of time;

receiving the positional information of the watercraft and the data related to the engine with the server;

determining whether or not the positional information of the watercraft is genuine with the server based on the data related to the engine in a predetermined period of time; and when it is determined that the positional information of the watercraft is not genuine, recording the watercraft whose positional information is not genuine, or transmitting a warning signal to the communicator of the watercraft; wherein the data related to the engine includes an operating time of the engine, a fuel flow rate, a speed of rotation of the engine, or a throttle opening degree.

* * * * *